United States Patent
Jouard et al.

(10) Patent No.: US 11,249,324 B2
(45) Date of Patent: Feb. 15, 2022

(54) SPECTACLE FRAME WITH CUT RIMS AND ATTACHABLE BRIDGE, KIT OF PARTS AND EYEWEAR

(71) Applicant: Essilor International, Charenton-le-Pont (FR)

(72) Inventors: Ludovic Jouard, Charenton-le-Pont (FR); Hélène Perchepied, Singapore (SG); Patricia Koh, Singapore (SG); Shindhe Gunputh, Singapore (SG); Frédéric Corbasson, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 241 days.

(21) Appl. No.: 16/493,908

(22) PCT Filed: Mar. 16, 2018

(86) PCT No.: PCT/EP2018/056688
§ 371 (c)(1),
(2) Date: Sep. 13, 2019

(87) PCT Pub. No.: WO2018/167279
PCT Pub. Date: Sep. 20, 2018

(65) Prior Publication Data
US 2020/0089022 A1    Mar. 19, 2020

(30) Foreign Application Priority Data
Mar. 16, 2017 (EP) .................................. 17161456

(51) Int. Cl.
*G02C 1/08* (2006.01)
*G02C 5/20* (2006.01)

(52) U.S. Cl.
CPC ................. *G02C 1/08* (2013.01); *G02C 5/20* (2013.01); *G02C 2200/04* (2013.01); *G02C 2200/08* (2013.01)

(58) Field of Classification Search
CPC . G02C 1/08; G02C 5/008; G02C 5/20; G02C 5/00; G02C 5/006; G02C 2200/04; G02C 2200/08

(Continued)

(56) References Cited

U.S. PATENT DOCUMENTS

| 6,454,406 B1 | 9/2002 | Guo |
| 2003/0223032 A1* | 12/2003 | Gagnon ................. A45C 11/04 351/92 |

(Continued)

FOREIGN PATENT DOCUMENTS

| CN | 204360040 U | 5/2015 |
| CN | 20181020977.1 | 3/2018 |

(Continued)

OTHER PUBLICATIONS

Office Action issued in Chinese Patent Application No. 201810209771 dated Apr. 7, 2020, with English translation provided.

(Continued)

*Primary Examiner* — Hung X Dang
(74) *Attorney, Agent, or Firm* — Nixon & Vanderhye (57) ABSTRACT

Disclosed is a spectacle frame including a pair of lens holding rims interconnected by a bridge, each rim being encircling and holding a lens in a central aperture of the rim, each rim being linked laterally to a temple, each rim having at least one cut allowing expansion of the central aperture or retraction and closure of the central aperture by closing the cut. The spectacle frame further includes a lock allowing closure and locking the cuts of the rims. The bridge attaches to the rims to allow attachment of one bridge chosen among (Continued)

bridges having different shapes and/or sizes and/or decorations to adapt the spectacle frame to different morphological features of wearers and/or to choices of the wearers, and wherein the rims and the bridge includes complementary bridge connector to attach and connect the bridge to each rim. A kit of parts and an eyewear are also disclosed.

19 Claims, 4 Drawing Sheets

(58) Field of Classification Search
USPC ....... 351/90, 92, 94, 95, 97, 98, 86, 83, 124
See application file for complete search history.

(56) References Cited

U.S. PATENT DOCUMENTS

2006/0132705 A1   6/2006  Li
2009/0279047 A1  11/2009  Tsai

FOREIGN PATENT DOCUMENTS

| KR | 2013 0001568 | 3/2013 |
| WO | WO 2014/126078 | 8/2014 |
| WO | WO 2016/166270 | 10/2016 |

OTHER PUBLICATIONS

International search Report, PCT/EP2018/056688, dated Jun. 4, 2018.

* cited by examiner

SPECTACLE FRAME WITH CUT RIMS AND ATTACHABLE BRIDGE, KIT OF PARTS AND EYEWEAR

TECHNICAL FIELD OF THE INVENTION

The invention relates to a spectacle frame that allows an easy adaptation to the wearer morphology, notably the interpupillary distance, and/or to the wearer taste as regards the eventual decoration, shape or esthetical features of his/her eyewear, as well as an easy mounting of lenses without screws or tools.

BACKGROUND INFORMATION AND PRIOR ART

Solutions for the adaptations of eyewears to wearers have been proposed as regards for example the attachment of the lenses to the frame or the adjustment of the interpupillary distance or even the choice of the temples.

However, these solutions offer partial solutions and are not optimized as regards the inventory of the parts of eyewears.

The instant invention allows easy adaptation for the lenses and for the shape and size of the frame and notably the interpupillary distance. Moreover, it allows the easy interchange of parts of the frame and that can be done by the wearer him/herself from a kit of parts.

SUMMARY OF THE INVENTION

Therefore, one object of the invention is to provide a spectacle frame comprising a pair of lens holding rims interconnected by a bridge, each rim being suitable to encircle and holding a lens in a central aperture of the rim, each rim being linked laterally to a temple, each rim having at least one cut allowing to expand the central aperture or to retract and close the central aperture by closing the cut, the spectacle frame further comprising at least one locking means allowing to close and lock the cuts of the rims.

According to the invention, the bridge is attachable to the rims in order to allow the attachment of one bridge chosen among bridges having different shapes and/or sizes and/or decorations to adapt the spectacle frame to different morphological features of wearers and/or to choices of the wearers, and the rims and the bridge comprise complementary bridge connecting means to attach and connect the bridge to each rim.

In the frame of the invention, each cut/split of a rim is delimited between two opposite and facing ends of the rim, the cut allowing to open laterally and possibly expand the central aperture by opening a gap between two ends of the rim or to retract and at least laterally close the central aperture by closing the gap. This allows easily attaching or detaching a lens in the rim.

In various embodiments of the frame according to the invention, the following means, which can be used alone or in any technically possible combination, are also used:

each rim is linked laterally to a temple through a hinge,
the complementary bridge connecting means are a bridge side bridge connecting mean and a rim side bridge connecting mean,
in each rim, a first cut is located toward the bridge and the complementary bridge connecting means are also the locking means of the cut of the rim,
each rim comprises only one cut that is located toward the bridge,
a second cut of the rim is located toward the temple, and each temple is attachable to the corresponding rim, the temple and the rim comprising complementary temple connecting means to attach and connect the temple to the rim, and said complementary temple connecting means are also the locking means of the cut of the rim,
each rim comprises only one cut that is located toward the temple,
each rim comprises two cuts that are located, one toward the bridge and the other toward the temple,
the complementary temple connecting means are a rim side temple connecting mean and a temple side temple connecting mean,
the temples are also detachable from the rims,
the temples are interchangeable on the rims,
each temple comprises a segment of the rim to close the cut located toward the temple,
the bridge is also detachable from the rims in order to allow an interchange of the bridge with another bridge chosen among bridges having different shapes and/or sizes and/or decorations to adapt the spectacle frame to different morphological features of the wearer or to the choice of the wearer,
the bridge is interchangeable on the rims,
the bridge is one piece/integral,
the bridge is made of a plurality of assembled pieces,
at least one extender can be connected to at least one of the two lateral sides of the bridge that are due to be connected to the rims, the extender being connected to the rims and comprising with the related rim, the complementary bridge connecting means, both the bridge and the extender having corresponding bridge side bridge connecting mean complementary to the rim side bridge connecting mean and the extender having rim side bridge connecting mean to connect to the bridge,
in addition the bridge is cut vertically in the middle and the resulting two lateral parts of the bridge are connectable together or to an extender arranged between the two lateral parts,
the complementary bridge connecting means and the eventual complementary temple connecting means are configured so that, in the closed and locking condition of the cut, the corresponding connecting means are straddling on the cut,
the complementary bridge connecting means are straddling on the cut due to the rim side bridge connecting mean having connecting elements at both ends of the rim cut,
the complementary temple connecting means are straddling on the cut due to the rim side temple connecting mean having connecting elements at both ends of the rim cut,
the connecting elements of the rim are clipping means comprising pins and enlarged heads,
the complementary bridge connecting means and the eventual complementary temple connecting means are clipping means,
the complementary bridge connecting means are a bridge side bridge connecting mean and a rim side bridge connecting mean and each cut of a rim is delimited between two opposite and facing ends of the rim, and the rim side bridge connecting mean comprises on each end of the rim cut at least one lateral pin with an enlarged head, said pin being oriented towards a corresponding lateral side of the bridge, and the bridge side bridge connecting mean comprises for each pin a corresponding hole for receiving the corresponding pin and its enlarged head, said hole having a head receiving recess, said head receiving recess being made at the level reach by the pin head in the bridge when the bridge is connected to the rim, and the enlarged head of the pin can fit and lock within said head receiving recess to lock the pin, in the bridge, each hole for the pin is a horizontal hole and the corresponding head receiving recess is a pit opened of a free face of the bridge and crossing the horizontal hole, in the bridge, the pits are vertically aligned and assembled in one common vertical through hole, the bridge comprises a segment of the rim to close the cut located toward the bridge, each cut of a rim is delimited between two ends of the rim between which the segment of the rim closing the cut is located/installed, the bridge comprises connecting means for connecting two separate nose pads or a pair of attached nose pads, the pair of lens holding rims are identical so that right and left lens received in the rims are interchangeable, the length of the temple is adjustable, each temple is made of at least two parts that can slide one relative to the other to adjust the length of the temple, the at least two parts of the temple comprise complementary releasable locking means allowing the length adjustment and the locking of the relative position of the at least two parts once the length adjusted.

A further object of the invention is to provide a spectacle frame kit of parts comprising items specifically shaped for making a spectacle frame according to the described invention, said items being:

a pair of lens holding rims, each rim being linked laterally to a temple and having at least one cut, a set of bridges, the bridges being at least attachable to the rims.

The above object is also implemented by providing the above-mentioned spectacle frame kit of parts that comprises a set of temples, the temples being at least attachable to the rim.

Another further object of the invention is to provide an eyewear comprising a spectacle frame according to the described invention and also a pair of lenses in the rims of the frame.

From another point of view of the invention, it is proposed a spectacle frame comprising a pair of lens holding rims joined together by a central bridge, each rim being suitable for encircling and holding a lens in a central aperture delimited by the rim, each rim being linked laterally to a temple, each rim having at least one cut defined between two opposite and facing ends of the rim, the at least one cut allowing to open and/or expand the central aperture by opening a gap between two ends of the rim or to retract and at least close the central aperture by closing the gap, the spectacle further comprising a locking system for closing the gaps and locking the cuts in the closed position.

According to said point of view of the invention, each cut is closable and lockable by one dedicated locking system arranged between the bridge and at least one of the ends of the rim cut, and each rim comprises a cut located towards the bridge and one of the two ends of the rim is linked to the bridge by a link while the other end of the rim and the bridge have complementary locking means for closing the gap and locking the cut and corresponding to the locking system.

The invention brings following technical advantages:

To facilitate the way to clip the different parts of a kit form frame.

To mount easily the lenses without screws or tools.

To personalize the frame thanks to the removable parts that can have different sizes, shapes or even colors. The personalization allows to adjust pupillary distance, increase the width of the frame to fit to all morphologies, improve the comfort of wear and change easily the aesthetic of the frame.

SHORT DESCRIPTION OF THE FIGURES

The appended figures will allow a good understanding of how the invention may be implemented. In these figures, same references designate similar elements. In addition, further advantages of the invention will become apparent in relation to the figures, in which.

DETAILED DESCRIPTION OF EXAMPLE(S)

Figure 1:
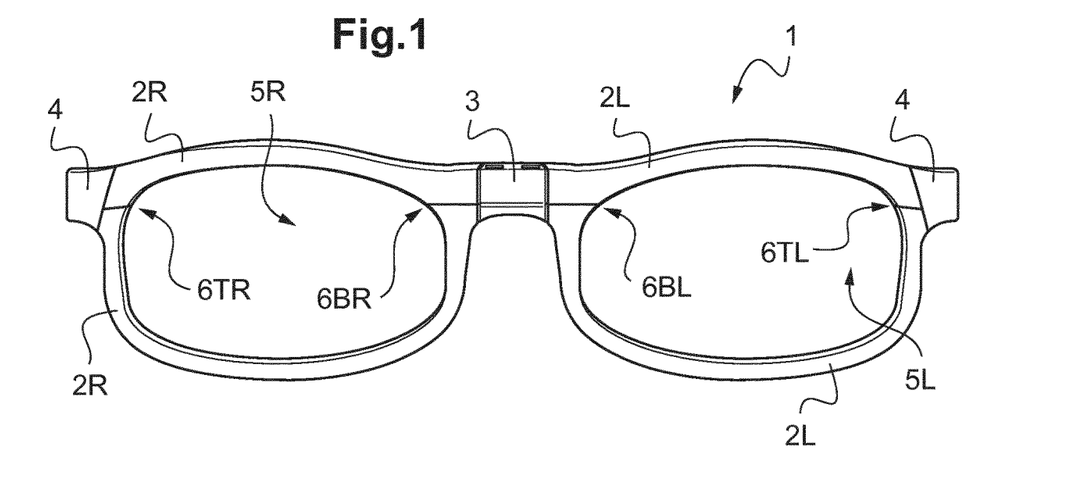
FIG. 1 is a front view of a spectacle frame according to the invention and comprising two lateral temples and two rims interconnected with a bridge thanks to complementary bridge connecting means.

On FIG. 1, the spectacle frame 1 has been assembled from two rims, a left rim 2L and a right rim 2R, that have been interconnected by a bridge 3 that is in a central location. The bridge 3 is interchangeable thanks to complementary bridge connecting means on each lateral side 17 of the bridge 3 and on the corresponding rim 2R, 2L and that are attachable and detachable allowing to mount and dismount each rim from the bridge 3. Each rim is connected/linked laterally to a temple 4 and said temple may include a hinge and in that case, the rim is connected/linked to the hinge that is connected/linked to the temple. The temple 4 is also interchangeable thanks to complementary temple connecting means on each lateral side of the rims and on the corresponding temple and that are attachable and detachable allowing to mount and dismount each temple from the rim. Each rim 2R, 2L defines centrally a central aperture 5R, 5L in which a lens can be held in place.

The spectacle frame material is a plastic material, thermoplastic or thermosetting. The spectacle frame can be made by molding and/or machining and/or 3D printing.

In order to be able to insert the lens in the central aperture 5R, 5L, at least one cut/split is made in each rim 2R, 2L. In the example of FIG. 1, two cuts 6TR, 6BR, 6TL, 6BL are made in each rim 2R, 2L, one cut 6BR, 6BL toward the bridge 3 and one cut 6TR, 6TL toward the temple 4. More precisely, for the right rim 2R for instance, a cut 6BR is made toward the bridge 3 and a cut 6TR is made toward the temple 4. Each cut 6TR, 6BR, 6TL, 6BL is defined by two opposed and facing ends of the rim and in FIG. 1, each cut is closed, the corresponding ends of the rim being one against the other and thus closing any gap between the ends. We will see in relation to FIG. 5 that the cuts can also be closed with a bridge 3 having segments of the rims. The cuts 6BR, 6BL toward the bridge 3 are closed because the bridge has been connected to the rims at those locations. The cuts 6TR, 6TL toward the temples are closed because the temples have been connected to the rims at those locations.

The complementary temple connecting means and the complementary bridge connecting means for all those connections between the rims, the bridge and the temples have two main functions, the first one is to link in a stable manner, but being detachable, the two corresponding elements and, the second one, is to close and lock the corresponding cut of the rim.

Figure 2:
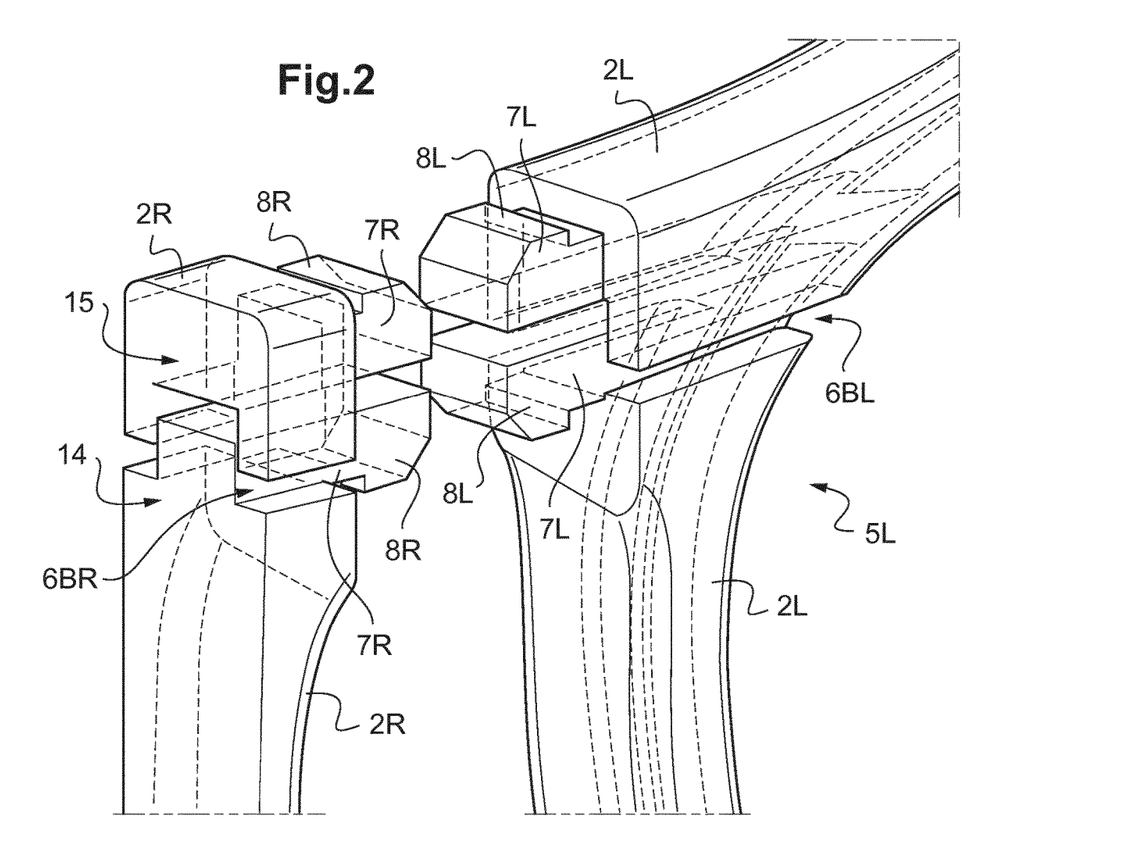
FIG. 2 is a partial schematic view of the two rims of the spectacle frame, the bridge being omitted to show each rim side bridge connecting mean of the complementary bridge connecting means.

In FIG. 2, the bridge has been omitted to be able to better see the central sides of the two rims 2R, 2L where the gaps 2BR, 6BL are located and where they can be connected to the bridge. A rim side bridge connecting mean 7R, 8R, 7L, 8L is arranged on the central side of each rim 2R, 2L, stradding the cut 6BR, 6BL, and this rim side bridge connecting mean is one part of the complementary bridge connecting means. Each rim 2R, 2L comprises a cut 2BR, 6BL that is shown with a gap opened due to the fact that the bridge is not connected. With the cut 6BR, 6BL having a gap opened, the central aperture 5R, 5L of the rim 2R, 2L has been enlarged. As it can be seen on the vertical sagittal cut view of the right rim 2R, on the right side of FIG. 2, the cut 6BR is not straight through the rim 2R but is indented in order to correctly arrange the two ends 14, 15 of the cut when closed and thus avoid an anteroposterior shift of the two ends 14, 15. In that example, for the cut 7R, the lower end 14 of the rim 2R comprises a protrusion that can enter a groove of the upper end 15 of the rim 2R, the protrusion and the groove being elongated along the length of the frame in the cut and connecting zone. As it can be seen by transparency in FIG. 2, such a protrusion and a groove are also made on the ends of the cut 6BL of the left rim 2L. Preferably, same protrusions and grooves are also made for the cuts toward the temples.

The rim side bridge connecting mean 7R, 8R, 7L, 8L comprise on each end of each cut 6BR, 6BL, a lateral pin 7R, 7L that is horizontal and oriented towards a corresponding lateral side 17 of the bridge 3 to which it is due to be connected. The lateral pin 7R, 7L terminates with an enlarged head 8R, 8L constituting a hook. For a given rim 2R, 2L, a pin 7R, 7L is arranged on each end 14, 15 of the cut 6BR, 6BL and thus a rim have two pins 7R, 7L. The bridge 3 is thus configured to accommodate four pins 7R, 7L and their heads 8R, 8L.

Figure 3:
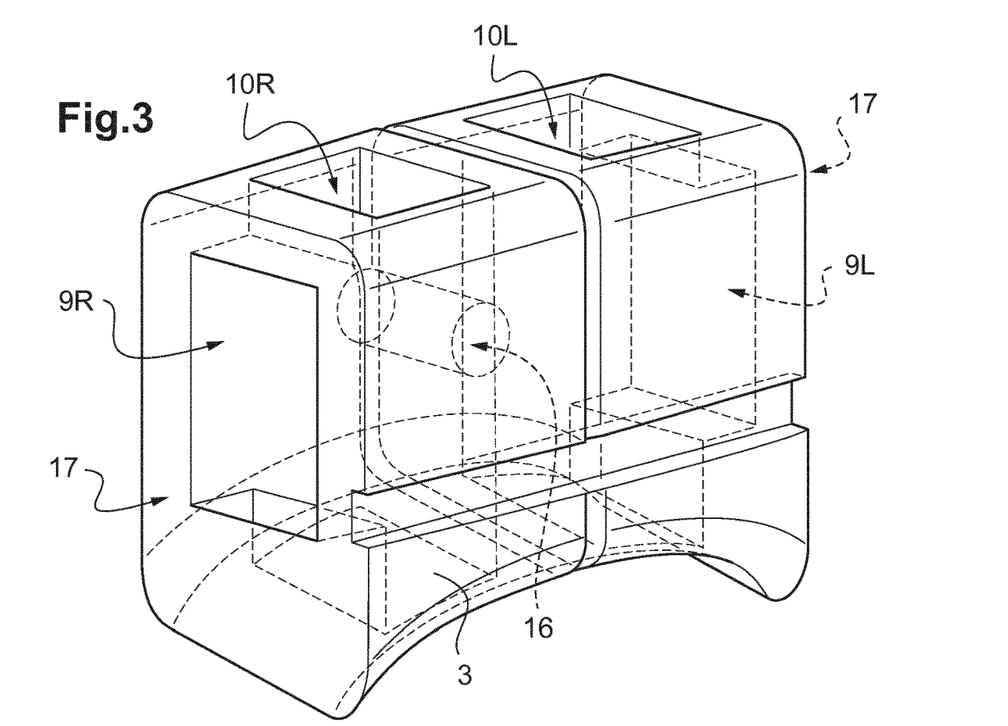
FIG. 3 is a schematic view of the bridge to show, on each lateral side of the bridge, the bridge side bridge connecting mean configured to receive and lock the corresponding rim side bridge connecting mean visible in FIG. 2.

The bridge 3 in the FIG. 3 is an integral piece that is pierced with at least two through holes or pits that are perpendicular for accommodating and locking the pins and heads of the rim side bridge connecting mean. Those holes are the bridge side bridge connecting mean of the complementary bridge connecting means. In the example of the FIG. 3, the vertical through hole suitable to accommodate the enlarged heads of the pins and defining the receiving recess, is split in two separated through holes 10R, 10L, each one for accommodating the heads of the rim side bridge connecting mean of one rim, left or right. Still in the example of the FIG. 3, the horizontal hole suitable to accommodate the pins is not a through hole but it is split in two separated blind holes 9R, 9L, each one for accommodating the pins of the rim side bridge connecting mean of one rim, left or right.

The pins 7R, 7L of the rim side bridge connecting mean have slight elastic properties to allow some bending when the pins and their heads are inserted in the holes of the bridge side bridge connecting mean and also when they are pulled out.

In addition, a further blind hole 16 (seen by transparency) that opens on the remote face of the bridge 3 in FIG. 3, and that is cylindrical, is arranged in the bridge. That blind hole 16 may be configured to receive a rod that will clamp the heads 8R, 8L locked in position when the rims are connected to the bridge. Without that clamping rod or after its removal, it could be possible to unlock the heads 8R, 8L and dismount the bridge from the rims by pushing them 8R, 8L on both sides of the vertical through holes 10R, 10L to unhook them and then pull apart the rims from the bridge. In another embodiment, the blind hole 16 is for receiving a rod that is a part of an element comprising nose pads. In a combined embodiment, the rod is both a clamping means for the pins+heads and part of a nose pads element.

Other ways of clamping the pins+heads are possible: for example, a plate that is slide between the two pins+heads of a given rim.

In some other instances, glue, hot melt or an equivalent can be poured in the vertical holes 10R, 10L to glue in place the heads thus avoiding further detachment/dismounting. It is understood that any other equivalent shape of the pins, heads and of the corresponding holes can be used. For instance, the horizontal hole(s) for the pin(s) can be (a) through hole(s) between the two lateral sides 17 of the bridge 3, one such horizontal hole thus receiving from both sides a left and a right pins and heads. The vertical hole defining the receiving recess for the enlarged head can instead be a blind hole. The vertical hole can be unique for the four heads of the four pins.

In other words, when the bridge 3 is attachable and possibly also detachable as to allow interchange of bridge, then each of the two rims and each lateral side 17 of the bridge comprise clipping complementary bridge connecting means to allow to connect the bridge 3 to the left 2L and right 2R rims of the spectacle frame 1. As the first cut 6BR, 6BL in each rim is located toward the bridge 3, the bridge is arranged straddling the two ends 14, 15 of the cut 6BR, 6BL of the rim. The clipping connecting means of the bridge 3 is also the locking means of the cut 6BR, 6BL: when the bridge 3 is connected to the rim 2R, 2L it closes and locks the cut 6BR, 6BL located toward the bridge.

The complementary bridge connecting means are, for a part, the lateral pins 7R, 7L and their enlarged heads 8R, 8L of the rim side bridge connecting mean. The complementary bridge connecting means are, for another part, the holes 9R, 9L, 10R, 10L of the bridge side bridge connecting mean. At the level of the pin head in the bridge hole 9R, 9L, when the bridge is connected to the rim, a receiving recess is made in which the enlarged head of the pin can fit and lock the pin in the bridge. The pin 7R, 7L having been bent by force through the hole 9R, 9L due to the enlargement of the head 8R, 8L when inserted in the bridge 3 till the head reach the receiving recess where the head 8R, 8L entered and thus releasing the force and bending of the pin. As represented FIG. 3, the receiving recess is made from a vertical through hole 10R, 10L crossing the bottom of the two horizontal holes 9R, 9L accommodating the two pins 7R, 7L.

Figure 4:
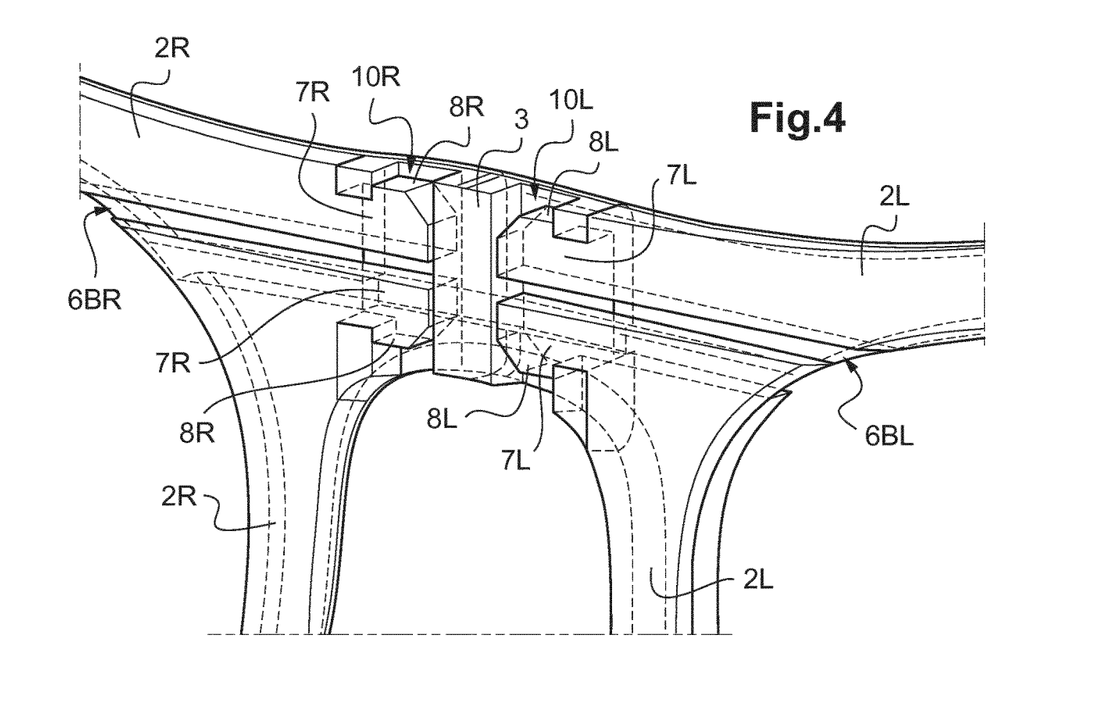
FIG. 4 is a perspective schematic view of a part of the spectacle frame obtained by assembling the rims and bridge of FIGS. 2 and 3, the frame having been cut vertically and longitudinally to show the relations of each bridge side bridge connecting mean and corresponding rim side bridge connecting mean in the connected and locked position.

In FIG. 4, the relations between the pins and heads of the rim side bridge connecting mean and the holes of the bridge side bridge connecting mean when the rims 2R, 2L are interconnected with the bridge 3, are better visualized. In such a configuration, the link/connection between the rim and the bridge is established and the cut 6BR, 6BL are closed and both locked due to the hook effect of the heads of the pins. Note that both front and rear faces of the spectacle frame, the cuts are preferably physically closed and hardly visible. However, it is possible to leave a slight slot on one or both front and rear faces of the spectacle frame for one reason or another and for example for aesthetical reasons. In all cases, when the cut is in closed position because the rims are connected and locked to the bridge, the resulting size of the central aperture is such that any lens in place in the rim is tightly held in place. It also means that the cuts 6BR, 6BL which appears with a slight gap on the foreground of FIG. 4 could have no gap in other embodiments. However, it should be noted that a gap is necessary between the two pins 7R, 7L+heads 8R, 8L of a same rim 2R, 2L to be able to bend them when inserting the pins 7R, 7L in the bridge 3 or for unlocking the heads 8R, 8L from the bridge.

Note that the same kind of pins+heads and holes may be used for the complementary temple connecting means used to attach and connect the temples to the rims. Preferably, the pins+heads are on the rim and the holes on the temple. In addition, if a second cut 6TR, 6TL is present on the temple side of the rim 2R, 2L, the complementary temple connecting means are straddling the ends of the rim cut and are also used to close and lock said cut in a similar way as for the cut 6BR, 6BL toward the bridge.

The last solution of same kind of pins+heads for the rim side bridge connecting mean and for the rim side temple connecting mean is particularly interesting because it allows making rims that are identical for the right or left eye and that are totally interchangeable even if the rims are incurved. Thanks to such a solution, the inventory of parts of the eyewear is much reduced because there is only one kind of rim that can be used on right or left eye.

Note that it is also possible to reduce the inventory of the parts with only one kind of rim with an integral temple if the rim is flat and if the temple is articulated to be turned on one face or the other of the rim, that is front or rear faces.

Note also that the rim can have only one cut located toward the bridge and that both the bridge and the temple may be attachable or even exchangeable, the complementary temple connecting means and the complementary bridge connecting means being similar but no cut/split being located toward the temple.

Figure 5:
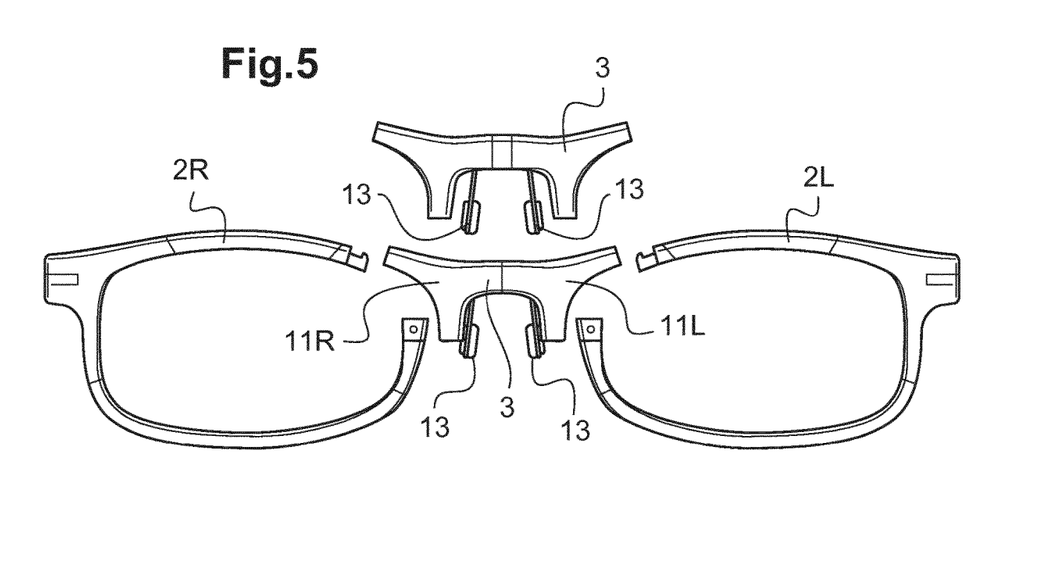
FIG. 5 is a front view of another embodiment of the spectacle frame in which the bridge comprises on each of its lateral sides, a segment of the rim and with a choice of two bridges that can be attached to the rims.

Another embodiment of the invention is now described in relation to FIG. 5. The gap of each cut located toward the bridge is closed thanks to a segment 11R, 11L of the corresponding rim 2R, 2L integral to the bridge 3. In that FIG. 5, two interchangeable bridges 3 are represented and have two different lengths to modify the interpupillary distance of the spectacle frame. Nose pads 13 are also represented on the bridges 3. Same kinds or other types of nose pads may be arranged on the bridge of the spectacle frame of the previous FIGS. 1 to 4 if the shape of their bridge and rims are not adapted to directly fit to a nose. The nose pads may be individual pads arranged on the bridge or a specific element having two nose pads and that is arranged on the bridge.

Figure 6:
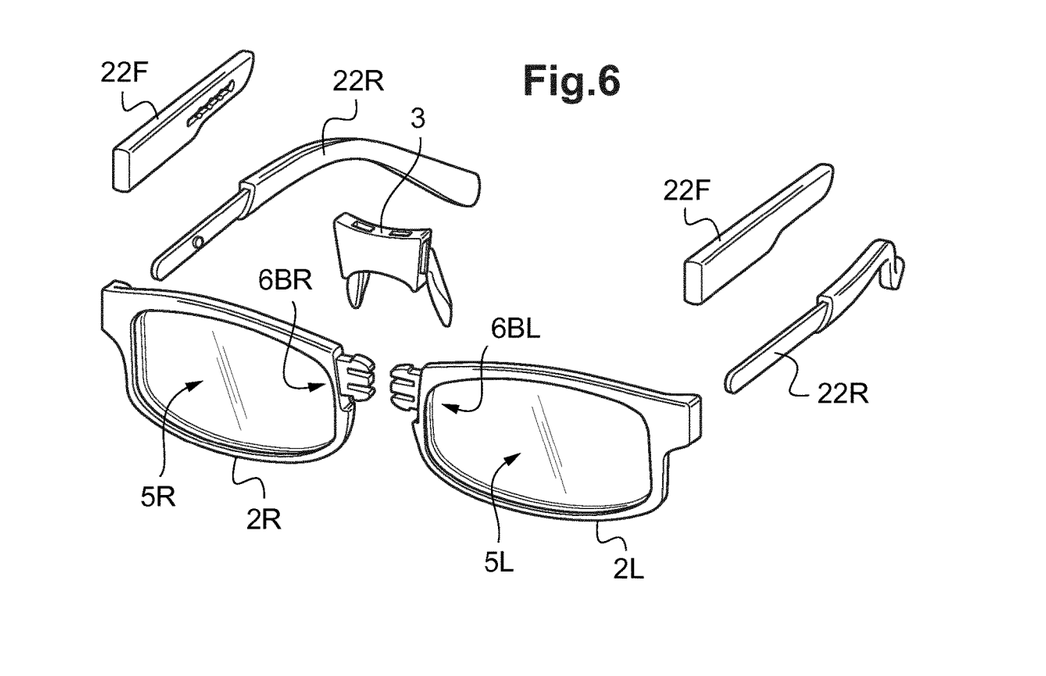
FIG. 6 is an exploded view of another spectacle frame of the invention.
Figure 7:
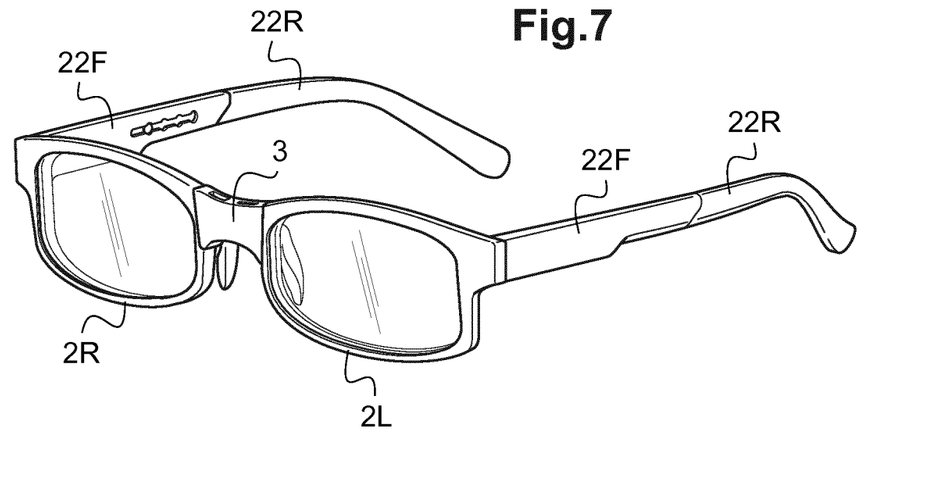
FIG. 7 is the spectacle frame of FIG. 7 when assembled.
Figure 8:
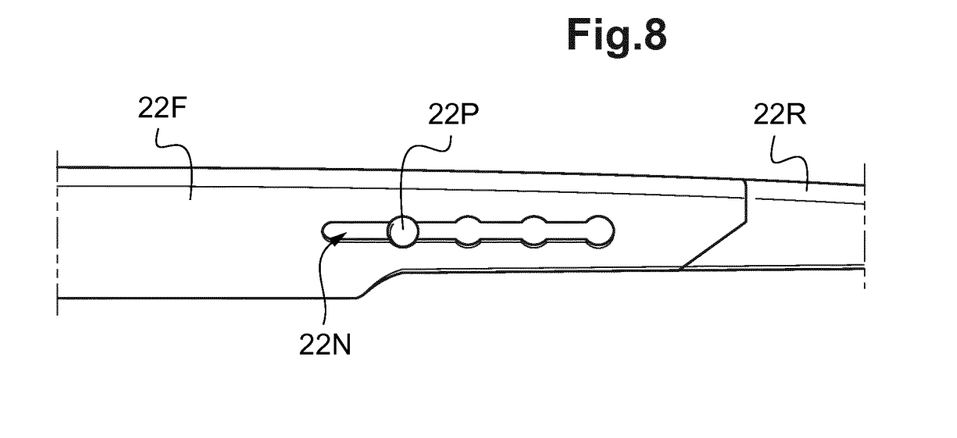
FIG. 8 is an enlarged view of a temple with two adjustable parts to adjust its length.

The embodiment of spectacle frame represented on the FIGS. 6 to 8 has only one cut 6BR, 6BL of the rim 2R, 2L and those cuts are closed and locked by the installation of the bridge between the two rims 2R, 2L. Thanks to only one cut 6BR, 6BL on each rim 2R, 2L there is no risk of loosing a part of a rim because it remains integral even if the cut is open for the insertion or removal of the lens.

Each temple of this spectacle frame can be adjusted in length and is made of two parts, a front part 22F connectable to the corresponding rim and preferably articulated to it, and a rear part 22R.

Those two parts 22F, 22R can slide one relative to the other. On FIG. 8, the means for adjusting and locking the two parts are better visible: a rim 22P of the rear part 22P can slide and be locked in an indexed groove 22N of the front part 22F. A front segment of the rear part 22R is entered in a channel or a tunnel of a rear segment of the front part 22F. Other adjusting and release locking means may be used.

Many other embodiments are possible. For example, if the thickness of the rim is sufficient to allow direct implementation of a resistant locking means between the two ends of the rim cut, the first end of the rim cut can have complementary bridge locking means with the bridge for the connection of the rim to the bridge and the second end of the cut can have connecting and locking means complementary to ones of the first end of the rim.

The invention claimed is:

1. A spectacle frame (1), comprising:
   a pair of lens holding rims (2R, 2L) interconnected by a bridge (3),
   each rim (2R, 2L) being configured to encircle and holding a lens in a central aperture (5R, 5L) of the rim (2R, 2L),
   each rim (2R, 2L) being linked laterally to a temple (4, 21R, 21L, 22),
   each rim (2R, 2L) having one cut (6BR, 6BL) between two opposite and facing ends of the rim, the cut allowing to expand the central aperture (5R, 5L) by opening a gap between the two ends of the cut of the rim or to retract and laterally close the central aperture by closing the cut (6BR, 6BL); and
   a locking means configured to close and lock the cut (6BR, 6BL) of the rim (2R, 2L),
   wherein the bridge is attachable to the rims (2R, 2L) in order to allow attachment of one bridge (3) chosen among bridges having different shapes and/or sizes and/or decorations to adapt the spectacle frame to different morphological features of wearers and/or to choices of the wearers,
   wherein the rims (2R, 2L) and the bridge (3) comprise complementary bridge connecting means (7R, 8R, 7L, 8L) (9R, 10R, 9L, 10L) to attach and connect the bridge (3) to each rim (2R, 2L),
   wherein in each rim (2R, 2L), the cut (6BR, 6BL) is located toward the bridge and the complementary bridge connecting means are also the locking means of the cut (6BR, 6BL) of the rim (2R, 2L),
   wherein the complementary bridge connecting means are configured so that, in a closed and locking condition of the cut (6BR, 6BL), the corresponding connecting means are straddling on the closed cut (6BR, 6BL),
   wherein the complementary bridge connecting means are a bridge side bridge connecting mean and a rim side bridge connecting mean, wherein the rim side bridge connecting mean comprises on each end of the rim cut at least one lateral pin with an enlarged head, said pin being oriented towards a corresponding lateral side of the bridge, and wherein the bridge side bridge connecting mean comprises, for each pin, a corresponding hole for receiving the corresponding pin and the corresponding pin's enlarged head, said hole having a head receiving recess, said head receiving recess being made at the level reach by the pin head in the bridge when the bridge is connected to the rim, and the enlarged head of the pin can fit and lock within said head receiving recess to lock the pin.

2. The spectacle frame according to claim 1, wherein the bridge is also detachable from the rims (2R, 2L) in order to allow an interchange of the bridge with another bridge chosen among bridges having different shapes and/or sizes and/or decorations to adapt the spectacle frame to different morphological features of the wearer or to the choice of the wearer.

3. The spectacle frame according to claim 2, wherein each temple is attachable to the corresponding rim (2R, 2L) (19R, 20R) (19L, 20L), the temple and the rim (2R, 2L) (19R, 20R) (19L, 20L) comprising complementary temple connecting means to attach and connect the temple to the rim (2R, 2L) (19R, 20R) (19L, 20L).

4. The spectacle frame according to claim 1, wherein each temple is attachable to the corresponding rim (2R, 2L) (19R, 20R) (19L, 20L), the temple and the rim (2R, 2L) (19R, 20R) (19L, 20L) comprising complementary temple connecting means to attach and connect the temple to the rim (2R, 2L) (19R, 20R) (19L, 20L).

5. The spectacle frame according to claim 4, wherein the complementary bridge connecting means and the eventual complementary temple connecting means are clipping means.

6. A spectacle frame kit of parts comprising items specifically shaped for making a spectacle frame according to claim 4, said items being:
  a pair of lens holding rims (2R, 2L), each rim (2R, 2L) being linked laterally to a temple and having one cut (6BR, 6BL), on the bridge side of the lens holding rim,
  a set of bridges, the bridges being at least attachable to the rims (2R, 2L), the rims (2R, 2L) and the bridge (3) comprising complementary bridge connecting means (7R, 8R, 7L, 8L) (9R, 10R, 9L, 10L) to attach and connect the bridge (3) to each rim (2R, 2L), and
  a set of temples, the temples being at least attachable to the rim (2R, 2L), the temple and the rim (2R, 2L) (19R, 20R) (19L, 20L) comprising complementary temple connecting means to attach and connect the temple to the rim (2R, 2L) (19R, 20R) (19L, 20L),
  wherein the complementary bridge connecting means are a bridge side bridge connecting mean and a rim side bridge connecting mean,
  wherein the rim side bridge connecting mean comprises on each end of the rim cut at least one lateral pin with an enlarged head, said pin being oriented towards a corresponding lateral side of the bridge, and
  wherein the bridge side bridge connecting mean comprises for each pin a corresponding hole for receiving the corresponding pin and the corresponding pin's enlarged head, said hole having a head receiving recess, said head receiving recess being made at the level reach by the pin head in the bridge when the bridge is connected to the rim, and the enlarged head of the pin can fit and lock within said head receiving recess to lock the pin.

7. The spectacle frame according to claim 1, wherein in the bridge, each hole for the pin is a horizontal hole and the corresponding head receiving recess is a pit opened of a free face of the bridge and crossing the horizontal hole.

8. The spectacle frame according to claim 1, wherein the bridge comprises a segment of the rim to close the cut located toward the bridge.

9. The spectacle frame according to claim 1, wherein the bridge comprises connecting means for connecting two separate nose pads or a pair of attached nose pads.

10. The spectacle frame according to claim 1, wherein the pair of lens holding rims are identical so that right and left lens received in the rims are interchangeable.

11. The spectacle frame according to claim 1, wherein a length of the temple is adjustable.

12. The spectacle frame according to claim 11, wherein each temple is made of at least two parts that can slide one relative to the other to adjust the length of the temple.

13. The spectacle frame according to claim 12, wherein the at least two parts of the temple comprise complementary releasable locking means allowing the length adjustment and the locking of the relative position of the at least two parts once the length adjusted.

14. A spectacle frame kit of parts comprising items specifically shaped for making a spectacle frame according to claim 1, said items being:
  a pair of lens holding rims (2R, 2L), each rim (2R, 2L) being linked laterally to a temple and having one cut (6BR, 6BL), on the bridge side of the lens holding rim, and
  a set of bridges, the bridges being at least attachable to the rims (2R, 2L),
  the rims (2R, 2L) and the bridge (3) comprising complementary bridge connecting means (7R, 8R, 7L, 8L) (9R, 10R, 9L, 10L) to attach and connect the bridge (3) to each rim (2R, 2L),
  wherein the complementary bridge connecting means are a bridge side bridge connecting mean and a rim side bridge connecting mean,
  wherein the rim side bridge connecting mean comprises on each end of the rim cut at least one lateral pin with an enlarged head, said pin being oriented towards a corresponding lateral side of the bridge, and
  wherein the bridge side bridge connecting mean comprises for each pin a corresponding hole for receiving the corresponding pin and the corresponding pin's enlarged head, said hole having a head receiving recess, said head receiving recess being made at the level reach by the pin head in the bridge when the bridge is connected to the rim, and the enlarged head of the pin can fit and lock within said head receiving recess to lock the pin.

15. The spectacle frame kit of parts according to claim 14, further comprising:
  a set of temples, the temples being at least attachable to the rim (2R, 2L).

16. Eyewear comprising a spectacle frame according to claim 1 and a pair of lenses in the rims (2R, 2L).

17. A spectacle frame kit of parts comprising items specifically shaped for making a spectacle frame according to claim 1, said items being:
  a pair of lens holding rims (2R, 2L), each rim (2R, 2L) being linked laterally to a temple and having one cut (6BR, 6BL), on the bridge side of the lens holding rim, a set of bridges, the bridges being both attachable to and detachable from the rims (2R, 2L), wherein the complementary bridge connecting means are a bridge side bridge connecting mean and a rim side bridge connecting mean, wherein the rim side bridge connecting mean comprises on each end of the rim cut at least one lateral pin with an enlarged head, said pin being oriented towards a corresponding lateral side of the bridge, and wherein the bridge side bridge connecting mean comprises for each pin a corresponding hole for receiving the corresponding pin and the corresponding pin's enlarged head, said hole having a head receiving recess, said head receiving recess being made at the level reach by the pin head in the bridge when the bridge is connected to the rim, and the enlarged head of the pin can fit and lock within said head receiving recess to lock the pin.

18. The spectacle frame kit of parts according to claim 17, further comprising:

a set of temples, the temples being at least attachable to the rim (2R, 2L).

19. The spectacle frame according to claim 1, wherein the two ends of the cut are one against the other when the cut is closed.

\* \* \* \* \*